US011471002B2

(12) United States Patent
Hurt

(10) Patent No.: US 11,471,002 B2
(45) Date of Patent: Oct. 18, 2022

(54) REMOVAL TOOL FOR ITEMS FROM HOT SKEWERS AND CAMPFIRE ROASTERS

(71) Applicant: Robert S Hurt, Becker, MN (US)

(72) Inventor: Robert S Hurt, Becker, MN (US)

( * ) Notice: Subject to any disclaimer, the term of this patent is extended or adjusted under 35 U.S.C. 154(b) by 0 days.

(21) Appl. No.: 16/715,186

(22) Filed: Dec. 16, 2019

(65) Prior Publication Data

US 2020/0187719 A1 Jun. 18, 2020

Related U.S. Application Data

(60) Provisional application No. 62/780,426, filed on Dec. 17, 2018.

(51) Int. Cl.
*A47J 43/28* (2006.01)

(52) U.S. Cl.
CPC .................................. *A47J 43/288* (2013.01)

(58) Field of Classification Search
CPC .... A47J 43/288; A47J 43/283; A47J 37/0786; A47J 45/00; F23J 1/04
USPC ........... 294/7, 8, 9, 179; 7/110; 30/324, 325; 99/419; D7/691
See application file for complete search history.

(56) References Cited

U.S. PATENT DOCUMENTS

| D120,610 | S | * | 5/1940 | Berge | D7/691 |
|---|---|---|---|---|---|
| D211,047 | S | * | 5/1968 | Johnson | D10/46.2 |
| D306,324 | S | * | 2/1990 | Dykes | D7/691 |
| D331,023 | S | * | 11/1992 | Mulry | D10/46.2 |
| D339,991 | S | * | 10/1993 | Mulry | D10/46.2 |
| D352,869 | S | * | 11/1994 | Lathrop | D7/691 |
| 5,595,569 | A | * | 1/1997 | Hebbard | A61B 17/50 606/131 |
| D394,014 | S | * | 5/1998 | Laib | D10/46.2 |
| 6,698,058 | B2 | * | 3/2004 | Cann | A47L 13/52 15/257.1 |
| D514,868 | S | * | 2/2006 | Achenbach | D7/318 |
| 7,188,878 | B1 | * | 3/2007 | Kraus | E01H 1/1206 248/101 |
| D613,134 | S | * | 4/2010 | McRorie, III | G01F 19/002 D7/691 |
| 8,459,707 | B2 | * | 6/2013 | Lipscomb | A01K 1/0114 294/1.3 |
| D691,426 | S | * | 10/2013 | Brown | D7/667 |
| D756,246 | S | * | 5/2016 | Kent | D10/46.2 |
| 2008/0136202 | A1 | * | 6/2008 | McRorie | G01F 19/002 294/180 |

* cited by examiner

*Primary Examiner* — Paul T Chin
(74) *Attorney, Agent, or Firm* — Gutwein Law; Greg Geiser

(57) ABSTRACT

An improved removal tool device configured as tool to aid in the removal of items from hot skewers and campfire roasters. The device having an interior space defined by a first wall, a second wall, a pair of adjacent sidewalls, and a bottom portion. The first wall includes a notch extending a substantial height of the first wall and configured to be utilized in the removal of a roasted food item. The device further includes a handle portion extending outward from the second wall opposite the interior space and culminating in a curved end with a pair of notches.

20 Claims, 5 Drawing Sheets

REMOVAL TOOL FOR ITEMS FROM HOT SKEWERS AND CAMPFIRE ROASTERS

CROSS-REFERENCE TO RELATED APPLICATION

This U.S. Patent Application Patent Application claims priority to U.S. Provisional Patent Application: 62/780,426 filed Dec. 17, 2018, the disclosure of which is considered part of the disclosure of this application and is hereby incorporated by reference in its entire

FEDERALLY SPONSORED RESEARCH OR DEVELOPMENT

Not Applicable

SEQUENCE LISTING, A TABLE, OR A COMPUTER PROGRAM

Not Applicable

FIELD OF THE INVENTION

This invention relates generally to a holding device for simplifying the process of removing an item from a hot skewer. More particularly, this invention relates to a device to aid in a making and constructing a S'more food item. A S'more being an assembled food item most generally consisting of graham crackers, marshmallow, and chocolate in a sandwich configuration.

BACKGROUND

Roasting food items over a heat source, such as a campfire, has been a pastime enjoyed by generations of individuals. One of the more common food items to be roasted is a marshmallow. Typically, the marshmallow is placed onto an end of a long stick, an extended fork, or a specialty roasting implement to extend the food item over the heat source while the user is in a safe position adjacent to the heat source. After roasting the marshmallow, or other food item, the user must remove it from the roasting implement prior to heating.

Although roasting and eating a marshmallow is a delicious treat by itself, an even more delicious treat is a S'more. In assembling this S'more, a user will often gently remove the marshmallow from the heated roasting device and place the marshmallow onto a graham cracker add chocolate and top the assembly with a second graham cracker. During this process, the heated marshmallow is often sticky and gooey and at a temperature that may burn if it comes into with skin. Further, the removal of the marshmallow additional requires the user to come into very close proximity with the end of the heated implement, which may also burn skin.

Therefore, there is a need within the market for a device that aids a user in the removal of a food item, such as a marshmallow, from a roasting implement. Still further, there is a need within the market for a device to aid in the assembly of a S'more. Further, it is preferred that this device has features to enable cleaning of the roasting implement after use and prior to the placement of another food item to be roasted.

BRIEF SUMMARY OF THE INVENTION

In one aspect, this disclosure is related to a dedicated device configured to aid a user in removing a food item from a roasting implement.

In another aspect, this disclosure is related to a dedicated device configured to aid a user in the assembly of a S'more.

In another aspect, this disclosure is related to a device configured to aid a user in cleaning a roasting implement.

The removal tool of the present disclosure comprises a first interior space generally forming a cavity defined by sidewalls having a height and a bottom portion coupled to the sidewalls. A first wall of the sidewalls includes a first notch, the first notch extending a substantial height of the first wall from an upper portion of a height of the first wall towards the bottom portion. The notch generally configured for the receipt of a portion of the roasting implement, wherein the food item is placed with the cavity from an exterior space with the roasting implement resting in the notch. Accordingly, a user can then manipulate the roasting implement through movement to retain the food item within the cavity and removing the food item from the roasting implement without directly contacting the food item.

In the preferred assembly of the present disclosure, the first wall containing the first notch is provided in a height superior to the height of a pair of adjacent sidewalls to aid in the removal of the food item after roasting. Each adjacent sidewall of the pair of adjacent sidewalls having an indentation generally extending from an upper portion of the height towards the bottom portion to generally provide access to the first interior space to aid a user in removing the roasted food item from the skewer.

The tool further comprises a handle portion extending at an exterior of the second wall opposite the interior space. The handle portion generally having a shape and structure to enable grasping by a user and culminating in a curved end. The curved end generally resembling a crowbar end and having a pair of notches. The pair of notches generally spaced apart a distance corresponding the width of a forked end of a roasting skewer. Accordingly, the pair of the notches configured for use by a user in cleaning the roasting end of a roasting implement, wherein the user will place the roasting end within the notches in frictional communication allowing a user to scrape and remove stuck on debris. In a preferred embodiment, the handle portion includes an aperture, the aperture through the handle and providing a surface for hanging or the placement of a lanyard to aid in storing and retaining the device when not in use.

The tool of the present disclosure is provided in a specific size and dimension to aid a user in the secondary use of constructing a S'more. To facilitate this use, the device first wall, second wall, bottom portion, and pair of adjacent sidewalls are dimensioned and arranged to define a square shaped cavity with the interior space sized to receive a standard graham cracker square to facilitate assembly. Accordingly, to construct a S'more using the device of the present disclosure, the user would first place first a graham cracker into the interior space, wherein the first graham cracker is rested on the bottom portion. A user will then utilize a roasting stick to heat and roast a marshmallow to the desired temperature. The user will then manipulate the roasting sick into the notch of the one wall, aligning the marshmallow on top of the graham cracker within the interior space of the device. The user will then top the marshmallow with various toppings, such as a chocolate square, and finally top the assembly with a second graham cracker. The user will then apply pressure to the assembly while gently removing the roasting stick from the marshmallow by moving the roasting stick outward from the interior space through the notch. The user will then have an assembled S'more within the interior, wherein the user may utilize the space of the indentation in each of the adjacent sidewalls to aid in the removal of the assembled S'more from the cavity of the interior space of the device.

To facilitate this use in constructing a S'more, the device bottom portion may be provided in an assembly that includes trough portions on each adjacent sidewall of the pair of adjacent sidewalls to aid in the removal of the S'more from the interior space.

The invention now will be described more fully hereinafter with reference to the accompanying drawings, which are intended to be read in conjunction with both this summary, the detailed description and any preferred and/or particular embodiments specifically discussed or otherwise disclosed. This invention may, however, be embodied in many different forms and should not be construed as limited to the embodiments set forth herein; rather, these embodiments are provided by way of illustration only and so that this disclosure will be thorough, complete and will fully convey the full scope of the invention to those skilled in the art.

DETAILED DESCRIPTION OF THE INVENTION

Figure 1:
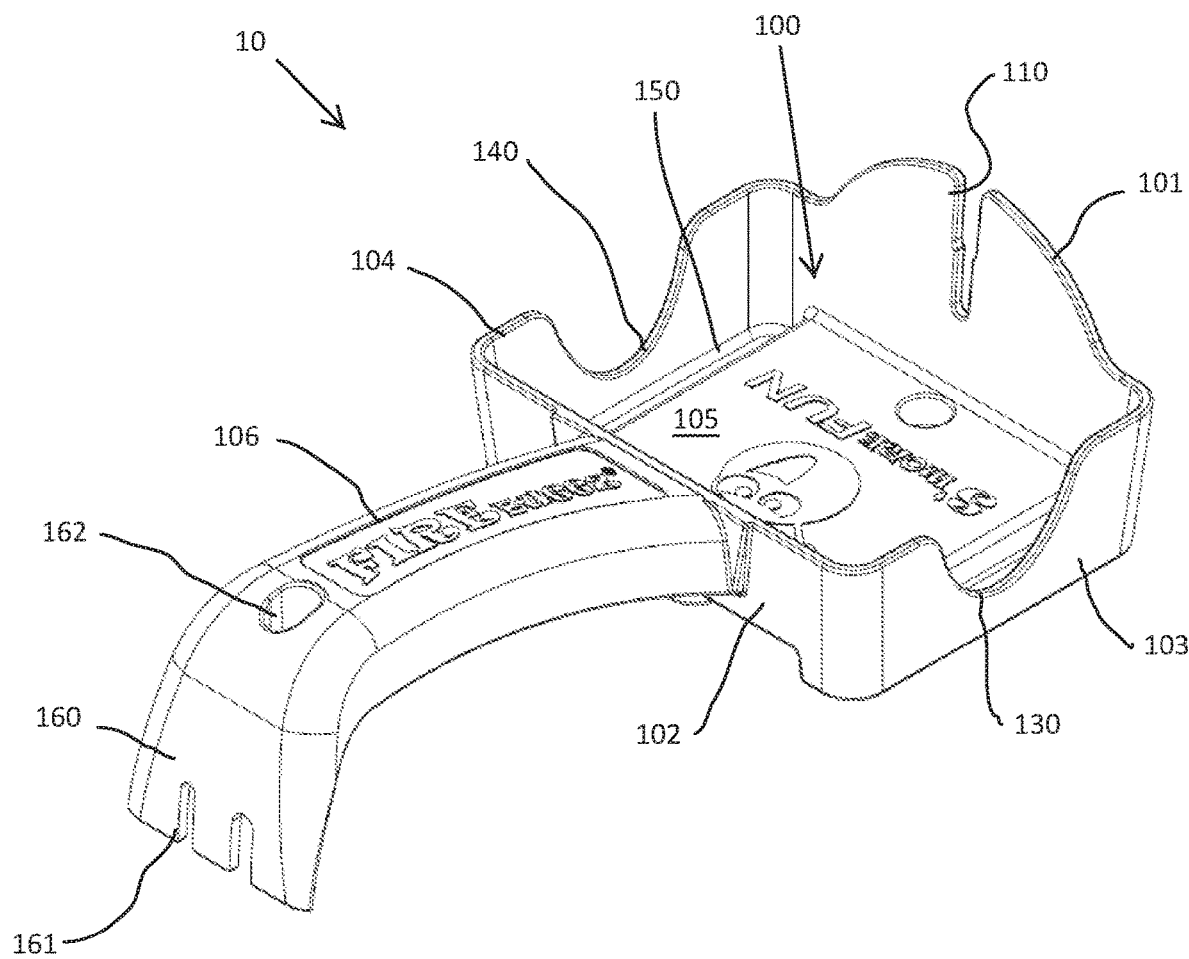
FIG. 1 is a perspective view of device, according to the present disclosure.

The following detailed description includes references to the accompanying drawings, which forms a part of the detailed description. The drawings show, by way of illustration, specific embodiments in which the invention may be practiced. These embodiments, which are also referred to herein as "examples," are described in enough detail to enable those skilled in the art to practice the invention. The embodiments may be combined, other embodiments may be utilized, or structural, and logical changes may be made without departing from the scope of the present invention. The following detailed description is, therefore, not to be taken in a limiting sense.

Before the present invention of this disclosure is described in such detail, however, it is to be understood that this invention is not limited to particular variations set forth and may, of course, vary. Various changes may be made to the invention described and equivalents may be substituted without departing from the true spirit and scope of the invention. In addition, many modifications may be made to adapt a particular situation, material, composition of matter, process, process act(s) or step(s), to the objective(s), spirit or scope of the present invention. All such modifications are intended to be within the scope of the disclosure made herein.

Unless otherwise indicated, the words and phrases presented in this document have their ordinary meanings to one of skill in the art. Such ordinary meanings can be obtained by reference to their use in the art and by reference to general and scientific dictionaries.

References in the specification to "one embodiment" indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The following explanations of certain terms are meant to be illustrative rather than exhaustive. These terms have their ordinary meanings given by usage in the art and in addition include the following explanations.

As used herein, the term "and/or" refers to any one of the items, any combination of the items, or all of the items with which this term is associated.

As used herein, the singular forms "a," "an," and "the" include plural reference unless the context clearly dictates otherwise.

As used herein, the terms "include," "for example," "such as," and the like are used illustratively and are not intended to limit the present invention.

As used herein, the terms "preferred" and "preferably" refer to embodiments of the invention that may afford certain benefits, under certain circumstances. However, other embodiments may also be preferred, under the same or other circumstances.

Furthermore, the recitation of one or more preferred embodiments does not imply that other embodiments are not useful and is not intended to exclude other embodiments from the scope of the invention.

As used herein, the terms "front," "back," "rear," "upper," "lower," "right," and "left" in this description are merely used to identify the various elements as they are oriented in the FIGS. with "front," "back," and "rear" being relative to the apparatus. These terms are not meant to limit the elements that they describe, as the various elements may be oriented differently in various applications.

As used herein, the term "coupled" means the joining of two members directly or indirectly to one another. Such joining may be stationary in nature or movable in nature. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

Figure 2:
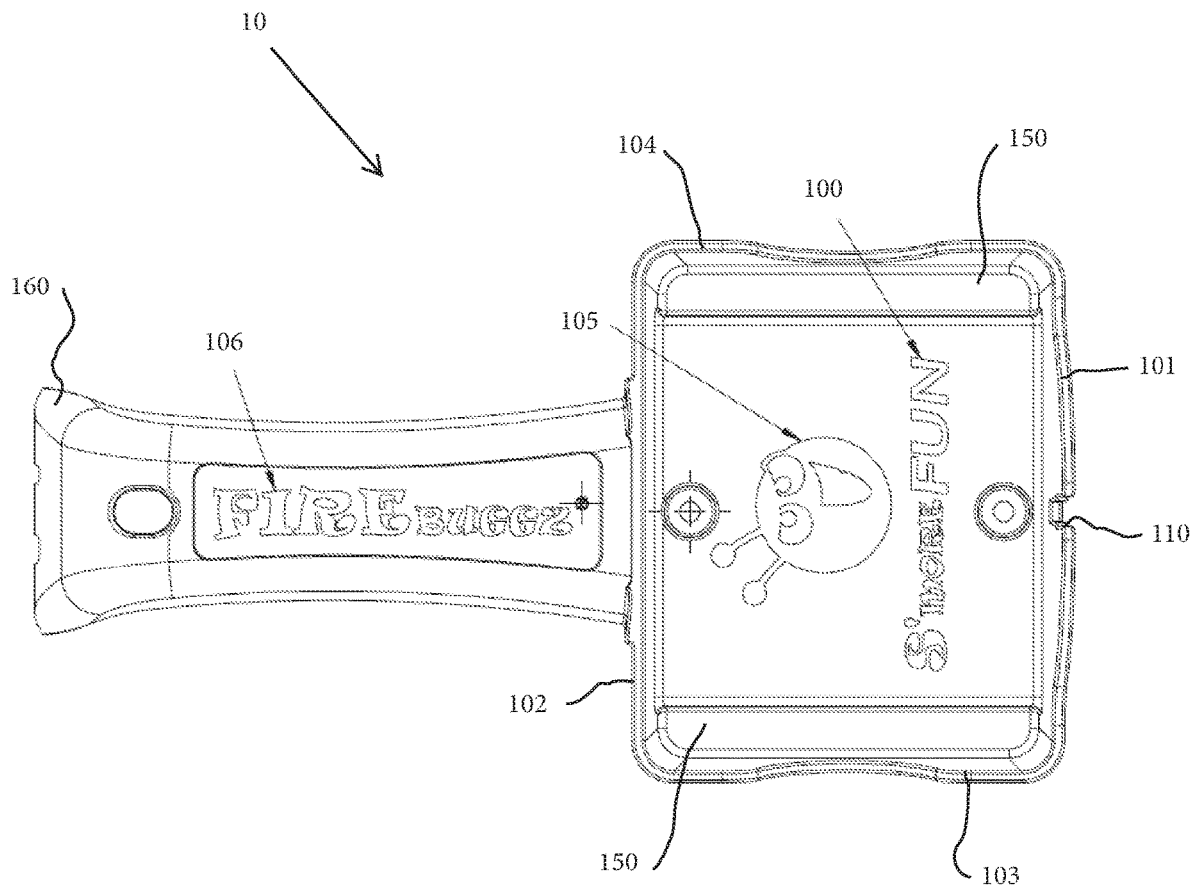
FIG. 2 is a top side view of the device, according to the present disclosure.
Figure 3:
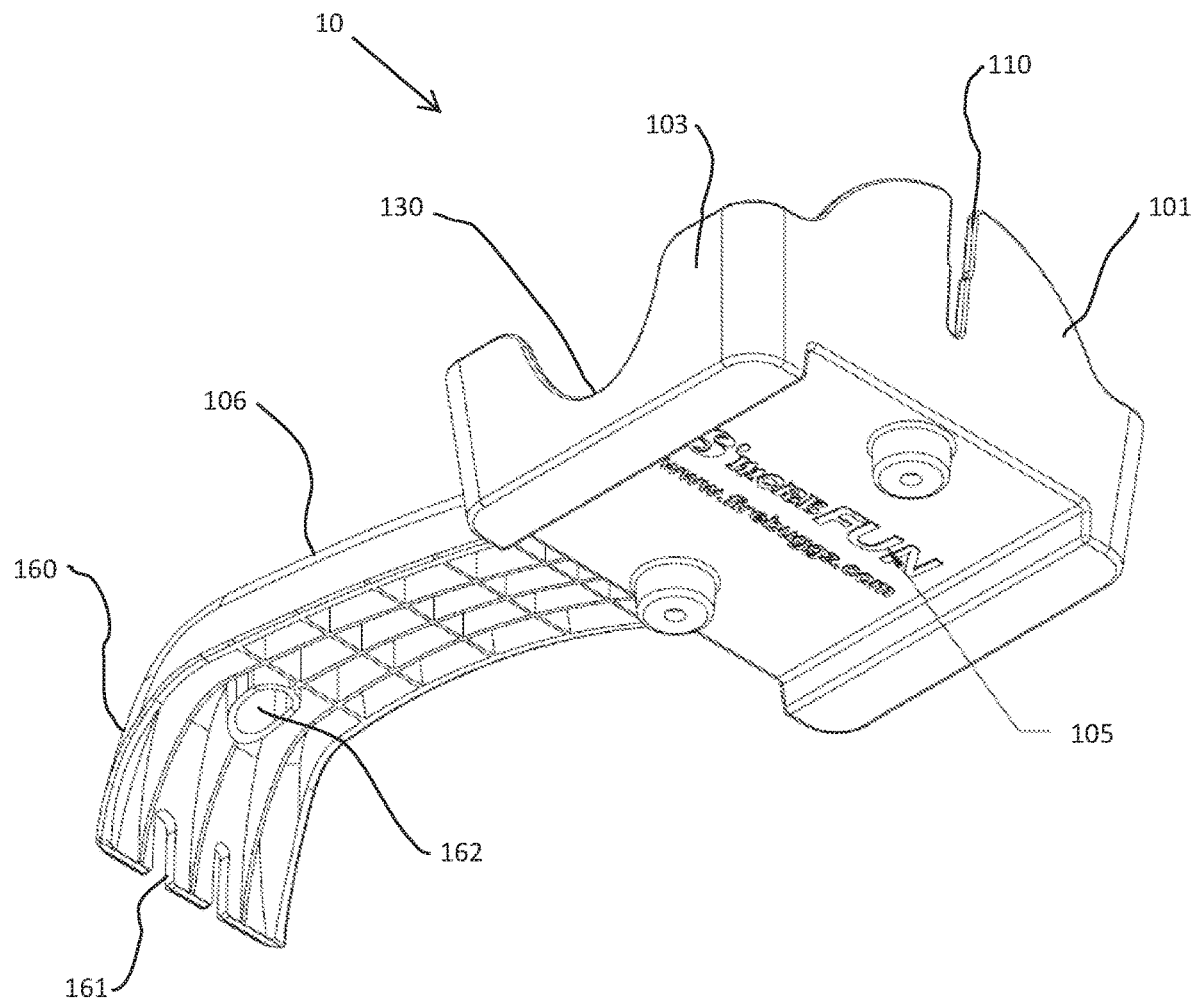
FIG. 3 is a perspective view of the underside of the device, according to the present disclosure.
Figure 4:
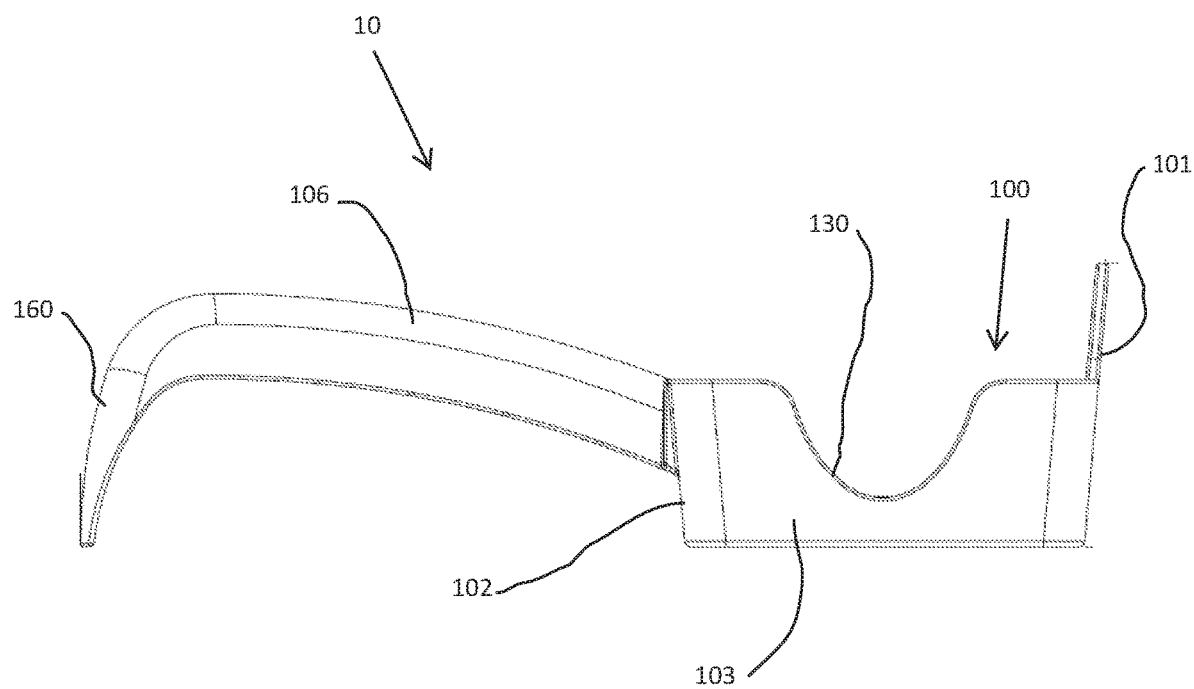
FIG. 4 is a side view of the device, according to the present disclosure.
Figure 5:
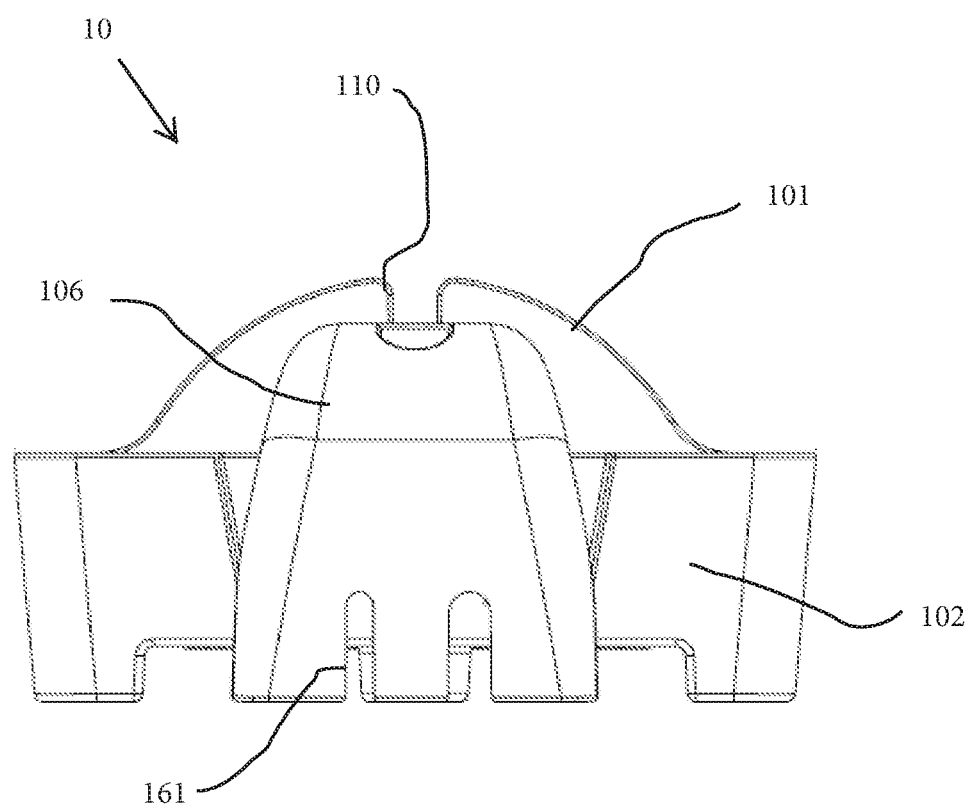
FIG. 5 is an end view of the device, according to the present disclosure.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure Referring now to FIGS. 1-5, of the removal tool of the present disclosure, most generally referred to as device 10. The device 10 comprises an interior space 100 defined by a height of a first wall 101, a pair of adjacent sidewalk 103, 104, and a second wall 102 in a coupled assembly to form a contiguous structure with a bottom portion 105 to surround the interior space 100. The first wall 101 including a first notch 110, the first notch 110 extending a substantial portion of the height of the first wall 101 from an upper portion of the height of the first wall 101 towards the bottom portion 105. The first notch 110 generally configured for the receipt of a portion of a roasting implement, such as, but not limited to, a roasting skewer, or roasting fork, wherein a food item retained on the roasting implement is placed within the interior space 100 from an exterior space with the roasting implement resting in the first notch 110. Accordingly, a user can then manipulate the roasting implement through movement to retain the food item within the interior space 100 by removing the food item from the roasting implement without directly contacting the food item.

In the preferred assembly of the present disclosure, the first wall 101 containing the first notch 110 is provided in a height superior to the height of the pair of adjacent sidewalk 103, 104 to aid in the removal of the food item after roasting. The first notch 110 having a width of the notch that is tapered in width from wider to narrower along the height of the first notch 110 from the upper portion to the bottom portion 105.

Each adjacent sidewall 103, 104 of the pair of adjacent sidewalk 103, 104 includes an indentation 130, 140 generally extending from an upper portion of the height towards the bottom portion 105 to generally provide access to the interior space 100 to aid a user in removing the roasted food item from the skewer. Preferably, the indentation 130, 140 is provided in an arcuate shape to allow a user easy access to the interior space 100 for easy grasping and manipulating of the food item within the interior space 100.

The device 10 further comprises a handle portion 106 extending from the second wall 102 at an exterior side opposite of the interior space 100 and directionally opposite the first wall 101. The handle portion 106 having a shape and structure to enable grasping by a user and culminating in a curved end 160. The curved end 160 generally resembling a crowbar end and having at least one notch 161. Preferably, the at least one notch 161 is a pair of notches 161. The pair of notches 161 generally spaced apart a distance corresponding the width of a forked end of one type of a roasting skewer. Accordingly, the at least one notch 161 is generally an arcuate shape having at least a portion of the arcuate shape comprised of a diameter corresponding to the diameter of a standard roasting skewer, wherein the at least one notch 161 is configured for use by a user in cleaning the roasting end of a roasting implement. Accordingly, a user will place the roasting end of the skewer within the at least one notch 161 in frictional communication allowing a user to scrape and remove stuck on debris.

In a preferred embodiment, the handle portion 106 includes an aperture 162, the aperture 162 through the handle portion 106 and providing a surface for hanging or the placement of a lanyard to aid in storing and retaining the device 10 when not in use.

The tool device 10 of the present disclosure may be provided in a specific size and dimension to aid a user in the secondary use of constructing a S'more food item. To facilitate this use, the device 10 first wall 101, second wall 102, bottom portion 105, and pair of adjacent sidewalk 103, 104 are dimensioned and arranged to define a square shaped cavity with the interior space 100 sized to receive a standard graham cracker square to facilitate assembly of a food item, such as, but not limited to a S'more. Accordingly, to construct a S'more using the device 10 of the present disclosure, the user would first place first a graham cracker into the interior space 100, wherein the first graham cracker is rested on the bottom portion 105. A user will then utilize the roasting implement to heat and roast a marshmallow to the desired temperature. The user will then manipulate the roasting sick into the notch 110 of the first wall 101, aligning the marshmallow on top of the graham cracker within the interior space 100 of the device 10. The user will then top the marshmallow with various toppings, such as, but not limited to a chocolate square, and finally top the assembly with a second graham cracker. The user will then apply pressure to the assembly while gently removing the roasting stick from the marshmallow by moving the roasting stick outward from the interior space 100 through the first notch 110. The user hen have an assembled S'more within the interior space 100, wherein the user may utilize the space of the indentations 130, 140 in each of the adjacent sidewalk 103, 104 to aid in the removal of the assembled S'more from the cavity of the interior space 100 of the device 10.

To facilitate this use in constructing a S'more, the device 10 bottom portion 105 may be provided in an assembly that includes trough portions 150 abutting each adjacent sidewall 103, 104 of the pair of adjacent sidewalls 103, 104 to aid in the removal of the S'more from the interior space 100.

The device 10 structure provided to sit level and flush on a horizontal surface. Accordingly, the handle portion 106 curved end 160 and bottom portion 105 are provided in a coplanar position to enable this level placement.

The device 10 of the present disclosure is preferably constructed out of a molded plastic and provided in a single unitary assembly. Still further, the shape and dimensions of the device 10 are preferably constructed in a manner to allow for nesting to aid in packaging and shipping.

While the invention has been described above in terms of specific embodiments, it is to be understood that the invention is not limited to these disclosed embodiments. Upon reading the teachings of this disclosure many modifications and other embodiments of the invention will come to mind of those skilled in the art to which this invention pertains, and which are intended to be and are covered by both this disclosure and the appended claims. It is indeed intended that the scope of the invention should be determined by proper interpretation and construction of the appended claims and their legal equivalents, as understood by those of skill in the art relying upon the disclosure in this specification and the attached drawings.

What is claimed is:

1. A removal tool device for removing items from hot skewers and campfire roasting implements, the device comprising:
    a first wall having a height and a first notch;
    a second wall having a height and positioned opposite the first wall;
    a pair of adjacent sidewalls having a height and connecting the first wall and the second wall;
    a bottom portion, the bottom portion coupled to the first wall, the second wall, and the pair of adjacent sidewalls in a contiguous assembly to define an interior space, the bottom portion having trough portions, the trough portions abutting each sidewall of the adjacent sidewalls; and
    a handle portion, the handle portion extending outward from an exterior of the second wall opposite the interior space and opposite the first wall, the handle portion culminating in a curved end, the curved end having at least one notch.

2. The removal tool device as in claim 1, wherein a width of the first notch is tapered from an upper portion of the first wall towards the bottom portion.

3. The removal tool device as in claim 2, wherein the first wall height is greater than a the height of the second wall and the pair of adjacent sidewalls.

4. The removal tool device as in claim 2, wherein each sidewall of the pair of adjacent sidewalls has an indentation.

5. The removal tool device as in claim 4, wherein the indentation is arcuate in shape.

6. The removal tool device as in claim 1, wherein the handle portion curved end has two notches.

7. The removal tool device as in claim 1, wherein the interior space is square in shape.

8. A removal tool device for removing items from hot skewers and campfire roasting implements, the device comprising:
- a first wall having a first notch, the first notch extending a portion of a height of the first wall;
- a second wall opposite the first wall;
- a pair of adjacent sidewalls connecting the first wall and the second wall, each sidewall of the pair of adjacent sidewalls having an indentation;
- a bottom portion, the bottom portion coupled to the first wall, the second wall, and the pair of adjacent sidewalls in a contiguous assembly to define an interior space, the bottom portion having trough portions, the trough portions abutting each sidewall of the adjacent sidewalls; and
- a handle portion, the handle portion extending outward from an exterior of the second wall opposite the interior space and opposite the first wall, the handle portion culminating in a curved end, the curved end having at least one notch.

9. The removal tool device as in claim 8, wherein a width of the first notch is tapered from an upper portion of the first wall towards the bottom portion.

10. The removal tool device as in claim 9, wherein the height of the first wall is greater than a height of the second wall and the pair of adjacent sidewalls.

11. The removal tool device as in claim 8, wherein the indentation is arcuate in shape.

12. The removal tool device as in claim 8, wherein the handle portion curved end has two notches.

13. The removal tool device as in claim 12, wherein the handle portion includes an aperture, the aperture through the handle portion to aid in hanging.

14. The removal tool device as in claim 8, wherein the interior space is square in shape.

15. The removal tool device as in claim 8, wherein the interior space size is configured for the receipt of a graham cracker.

16. A device to aid in the assembly of a S'more, the device comprising:
- a first wall having a first notch, the first notch tapered and extending a portion of a height of the first wall from an upper portion towards a bottom portion;
- a second wall opposite the first wall, wherein the second wall is parallel to the first wall;
- a pair of adjacent sidewalls connecting the first wall and the second wall, each sidewall of the pair of adjacent sidewalls having an indentation, wherein the pair of adjacent sidewalls are parallel in relation to each other;
- the bottom portion, the bottom portion coupled to the first wall, the second wall, and the pair of adjacent sidewalls in a contiguous assembly to define an interior space, the bottom portion having trough portions, the trough portions abutting each sidewall of the adjacent sidewalls; and
- a handle portion, the handle portion extending outward from an exterior of the second wall opposite the interior space and opposite the first wall, wherein the handle extends upwardly in relation to the bottom portion, the handle portion culminating in a curved end, the curved end having at least one notch.

17. The device as in claim 16, wherein the height of the first wall is greater than a height of the second wall and the pair of adjacent sidewalls.

18. The device as in claim 17, wherein the indentation is arcuate in shape.

19. The device as in claim 17, wherein the handle portion curved end has two notches.

20. The device as in claim 17, wherein the interior space is square in shape and provided in a size for the receipt of a graham cracker.

* * * * *